United States Patent [19]

Cronson et al.

[11] 4,188,595

[45] Feb. 12, 1980

[54] SHIELDED SURFACE WAVE TRANSMISSION LINE

[75] Inventors: Harry M. Cronson; Basrur R. Rao; Gerald F. Ross, all of Lexington, Mass.

[73] Assignee: Sperry Corporation, New York, N.Y.

[21] Appl. No.: 935,238

[22] Filed: Aug. 21, 1978

[51] Int. Cl.2 .......................... H01P 5/18; H01P 3/10; H04B 7/26

[52] U.S. Cl. ...................................... 333/113; 179/82; 246/63 R; 246/187 C; 325/64; 333/240

[58] Field of Search .................. 333/113, 240; 179/82; 246/63 R, 63 C, 167 R, 182 R, 187 C; 325/55, 64

[56] References Cited

U.S. PATENT DOCUMENTS 3,290,626 12/1966 Hafner ................................ 333/240

*Primary Examiner*—Paul L. Gensler

*Attorney, Agent, or Firm*—Howard P. Terry; Seymour Levine

[57] ABSTRACT

A continuous, self-supporting microwave transmission line along which ultra short pulses of microwave signals may propagate over distances of several hundred feet with minimum pulse distortion and signal attenuation. Propagation along the line is accomplished by an electromagnetic field thereabout that is sensitive to objects positioned in the proximity of the transmission line, a characteristic that may be utilized in short pulse reflectometer systems for monitoring and control of vehicles on a prescribed course.

10 Claims, 3 Drawing Figures

SHIELDED SURFACE WAVE TRANSMISSION LINE

BACKGROUND OF THE INVENTION

1. Field of the Invention

The subject invention pertains to the field of transmission lines and more particularly to a surface waveguiding structure which is self-supporting and exhibits minimum attention and dispersion characteristics.

2. Description of the Prior Art

Communication and short pulse guided wave reflectometer control systems for constrained vehicle ground transportation require guiding structures along the right-of-way. These guiding structures must exhibit minimum attenuation and dispersion characteristics, must possess surface wave fields that extend a sufficient distance from the structure to couple to the vehicle and objects placed adjacent to the right-of-way must be self-supporting, and must operate reliably in adverse weather conditions. Surface wave and leaky wave transmission lines such as the dielectric image line, Goubau line, slotted and braided coaxial cables, and trough and W-lines do not possess all these required characteristics. Dielectric image lines are highly dispersive and cause significant pulse broadening which degrades the range resolution of the system, while conventional Goubau lines are not self-supporting and are adversely affected by environmental conditions such as ice and snow. Leaky coaxial cables exhibit excessive loss and quasi TEM lines such as the W-line and the metallic and dielectric shielded Goubau lines, due to the shielding thereof, are very insensitive to external objects.

It is the object of the present invention to provide a self-supporting surface waveguide structure for vehicle control and communication systems, which is sensitive to objects positioned a reasonable distance therefrom and which exhibits minimum attenuation and dispersion characteristics.

SUMMARY OF THE INVENTION

In accordance with the present invention, there is provided a surface wave transmission line on which ultra short pulse signals may propagate with minimum pulse distortion and attenuation. This transmission line is a continuous self-supporting structure which comprises an electromagnetic surface waveguide mounted at the apex of a wedge formed by a dielectric support structure and held thereat by means of a dielectric wire positioned at the surface waveguide diametrically opposite the apex and extending through each side of the wedge. Each section of the wedge is flared at the base to provide a mounting bracket so that the transmission line assembly may be mounted on a vertical or horizontal surface.

An electromagnetic field due to an ultra short pulse propagating along the surface waveguide is sensitive to objects placed within a specified distance of the transmission line, making the transmission useful in a time domain reflectometer for a high resolution constrained vehicle control system. The dielectric wedge which shields the surface waveguide permits hot air to be circulated therewithin. This hot air circulation prevents the accumulation of ice and snow during inclement weather on installations exposed to the environmental elements, thus permitting normal coupling to either transmission lines and to external objects.

DESCRIPTION OF THE PREFERRED EMBODIMENTS

Figure 1:
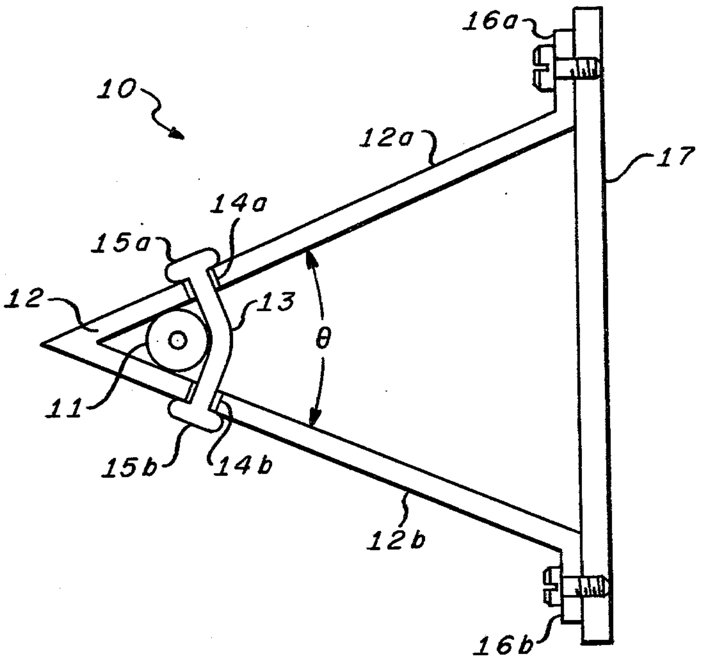
FIG. 1 is a cross-sectional view of a preferred embodiment of the invention.

FIG. 1 shows a cross-sectional view of an embodiment of a shielded surface wave transmission line 10 which may comprise a surface waveguiding structure 11 held within the internal angle $\theta$ of a wedge-shaped shield 12 by a dielectric wire 13. It is desired that surface waveguiding structure 11 be capable of propagating pulse signals with durations in the order of nanoseconds. Since these signals have frequency components that extend substantially down to d.c., the transmission line 11 fastened at the apex of the wedge 12 must be capable of supporting surface wave modes that exhibit extremely low cut-off frequency characteristics. One such surface wave mode is the axially symmetric $TM_0$ surface wave, mode signals of which propagate with very low loss along the axis of a circularly symmetric transmission line but which decay exponentially in a radial direction. For the surface wave transmission line shown in FIG. 1, the radial field decay is controlled by the thickness and dielectric constant of the insulation about the circular wire and a dielectric constant of the wedge-shaped shield. This type of surface wave mode has no frequency cut-off and can therefore be used for the propagation of signals with frequencies down to d.c.

A shielded surface wave transmission line capable of supporting a $TM_0$ mode may comprise a surface waveguiding structure 11 which may be a transmission line of the type disclosed by Goubau in U.S. Pat. No. 2,685,068 issued July 27, 1954. More particularly, to propagate an L-band signal of between 2 and 3 nanosecond duration, the shielded surface wave transmission line 10 may include a surface waveguiding structure 11 which may comprise a number 12 copper wire with a 15 mil thick TEFLON insulating sleeve thereabout which has a dielectric constant of 2.1 and a loss tangent that is less than $2\times10^{-4}$, held at the apex of the wedge 12 which may comprise a 1/16" (0.16 cm) thick, high impact, polystyrene with a relative dielectric constant of 2.4 and a loss tangent of $4\times10^{-4}$. The apex angle $\theta$ of the wedge 12 may be 60° and each side thereof may be 4.6" (11.68 cm) in length. Surface waveguiding structure 11 may be held in place at the apex by a 1/16" (0.16 cm) TEFLON wire which has a relative dielectric constant of 2.1 with a loss tangent that is less than $2\times10^{-4}$. This TEFLON wire passes through holes 14*a*, 14*b*, with diameters of 3/32" (0.24 cm), drilled in the sides 12*a*, 12*b*, and is held in place by flattening and cold forming the ends 15*a*, 15*b* thereof. Each side 12*a*, 12*b* may be flared outward at the base to form mounting flanges 16*a*, 16*b* through which the entire assembly may be mounted to a mounting structure 17.

Figure 2:
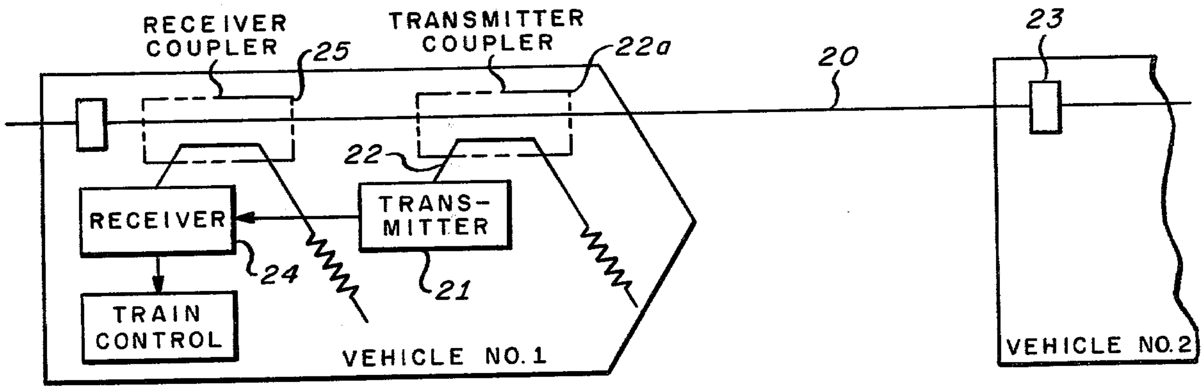
FIG. 2 is a block diagram representation of the system wherein the invention is useful.

A block diagram of a rapid transit system in which the present invention may be utilized is shown in FIG. 2. A surface wave transmission line 20 such as that described above is supported parallel to the guide way of the vehicles of the rapid transit system such as vehicle No. 1 and vehicle No. 2. A transmitter 21 couples a short pulse signal to a surface wave transmission line 22 which is of a similar construction to that of transmission line 20. The external apex of a portion of the transmission line 22 is positioned to be substantially parallel and adjacent to the apex of surface wave transmission line 20 to form a coupler 22*a*. Coupling coefficient for coupling sections of transmission line 22 three feet (91.44 cm) in length will vary between approximately 18 and 27 dB as the distance between transmission line 22 and the surface wave transmission line 20 varies between 3" (7.62 cm) and 6" (15.24 cm). Short pulse signals coupled in this manner propagate along the surface wave transmission line 20 to be reflected from a reflector 23, yet to be described, positioned near the rear of vehicle No. 2 which precedes vehicle No. 1 along the guide way. Reflected short pulse signals propagate along the surface wave transmission line 20 and are coupled to receiver 24 via a coupler 25 that is similar to the transmitter coupler 22*a* previously described.

Figure 3:
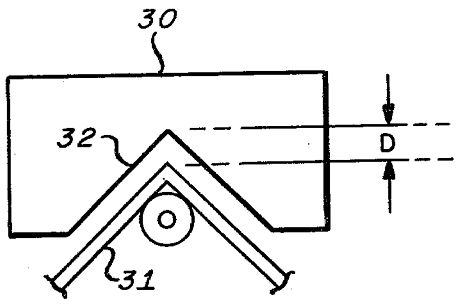
FIG. 3 is a representation in cross-sectional view of the invention with a reflector thereabout.

Refer now to FIG. 3, wherein a cross-sectional view of a reflector 30 positioned adjacent to a shielded surface wave transmission line 31 is shown. Reflector 30 may be a metallic plate with the wedge-shaped notch 32 cut therein that conforms with the wedge formed by the dielectric shielding of the surface wave transmission line 31. Short pulse signals propagating along the surface wave transmission line 31 will be reflected from reflector 30, the reflection coefficient of which is dependent upon the wedge spacing D between the apex of the notch 32 in reflector 30 and the external apex of the shielded surface wave transmission line 31. This reflection coefficient is in the order of −16.5 dB when the reflector is a 12" (30.48 cm) metallic plate positioned in the order of 3" (7.62 cm) from the shielded surface wave transmission line 31.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A transmission line apparatus comprising:
a wedge-shaped shield of dielectric material having an internal angle and an external apex formed by the intersection of the two sides thereof;
means positioned within said internal angle for the propagation of surface waves; and
means for maintaining said surface wave propagation means within said internal angle and in contact with each side of said wedge-shaped shield.

2. A transmission line apparatus in accordance with claim 1 wherein each side of said wedge-shaped shield is flared at the base to provide a mounting bracket.

3. A transmission line apparatus in accordance with claim 1 wherein each of said sides has a hole and said maintaining means is a wire made of dielectric material which extends through each of said holes.

4. A transmission line apparatus in accordance with claims 1 or 3 wherein said surface wave propagation means comprises a circular metallic wire with a sleeve of dielectric material thereabout.

5. A transmission line apparatus in accordance with claim 1 further including a metallic plate positioned adjacent said external apex thereby providing a reflector for surface wave propagating along said surface wave propagation means.

6. A transmission line apparatus in accordance with claim 5 wherein said metallic plate contains a notch therein of the same configuration as said wedge-shaped shield in the vicinity of said external apex, said metallic plate positioned with respect to said wedge-shaped shield such that an apex of said notch is at a predetermined distance from said external apex.

7. A surface coupling apparatus comprising:
a first transmission line which comprises:
a wedge-shaped shield of dielectric material having an internal angle and an external apex formed by the intersection of the two sides thereof;
means positioned within said internal angle for the propagation of surface waves; and
means for maintaining said surface wave propagation means within said internal angle and in contact with each side of said wedge-shaped shield; and
a second transmission line positioned to be in an energy coupling relationship with said first transmission line, said second transmission line comprising:
a wedge-shaped shield of dielectric material having an internal angle and an external apex formed by the intersection of the two sides thereof;
means positioned within said internal angle for the propagation of surface waves; and
means for maintaining said surface wave propagation means within said internal angle and in contact with each side of said wedge-shaped shield.

8. A surface wave coupling apparatus in accordance with claim 7 wherein said first and second transmission lines are positioned such that said external apex of said first transmission line and said external apex of said second transmission line are substantially parallel.

9. A surface wave coupling apparatus in accordance with claims 7 or 8 wherein each of said sides of said wedge-shaped shield of said first and second transmission lines has a hole and said maintaining means of said first and said transmission lines is a wire of dielectric material which extends through said holes.

10. A surface wave coupling apparatus in accordance with claims 7 or 8 wherein said surface wave propagation means of said first and second transmission lines comprises a circular metallic wire with a sleeve of dielectric material thereabout.

* * * * *